(12) United States Patent
Feng et al.

(10) Patent No.: US 9,710,353 B2
(45) Date of Patent: Jul. 18, 2017

(54) CREATING COMPOSITE BASELINES BASED ON A PLURALITY OF DIFFERENT BASELINES

(71) Applicant: Oracle International Corporation, Redwood Shores, CA (US)

(72) Inventors: Michael Feng, San Mateo, CA (US); Mark Ramacher, San Carlos, CA (US); Gary Ngai, Saratoga, CA (US); Graham Wood, El Granada, CA (US); John Beresniewicz, Half Moon Bay, CA (US)

(73) Assignee: Oracle International Corporation, Redwood Shores, CA (US)

( * ) Notice: Subject to any disclaimer, the term of this patent is extended or adjusted under 35 U.S.C. 154(b) by 119 days.

(21) Appl. No.: 14/665,173

(22) Filed: Mar. 23, 2015

(65) Prior Publication Data

US 2015/0199257 A1 Jul. 16, 2015

Related U.S. Application Data

(62) Division of application No. 12/111,011, filed on Apr. 28, 2008, now Pat. No. 8,990,811.

(Continued)

(51) Int. Cl.
*G06F 11/34* (2006.01)
*G06F 11/36* (2006.01)

(52) U.S. Cl.
CPC ...... *G06F 11/3495* (2013.01); *G06F 11/3409* (2013.01); *G06F 11/3428* (2013.01); *G06F 11/3616* (2013.01)

(58) Field of Classification Search
CPC .......................... G06F 11/3495; G06F 11/3428
See application file for complete search history.

(56) References Cited

U.S. PATENT DOCUMENTS

| 2,883,255 A | 4/1959 | Anderson |
| 3,324,458 A | 6/1967 | MacArthur |

(Continued)

FOREIGN PATENT DOCUMENTS

| JP | 55091036 A | 7/1980 |
| JP | 02-232795 | 9/1990 |

(Continued)

OTHER PUBLICATIONS

Beresniewicz, "Metric Baselines: Detecting Unusual Performance Events Using System-Level Metrics in EM 10GR2," pp. 1-13, by Oracle Corporation, Mar. 2005.

(Continued)

*Primary Examiner* — Jacob A Petranek
(74) *Attorney, Agent, or Firm* — Kilpatrick Townsend & Stockton LLP

(57) ABSTRACT

Techniques that improve manageability of systems. Techniques are provided for creating different types of baselines that are more flexible and dynamic in nature. A future-based baseline may be created defining a period of time, wherein at least a portion of the period of time is in the future. A baseline may be created that is a composite of multiple baselines. In general, baselines may be specified having one or more periods of time that are either contiguous or non-contiguous. A template for creating a set of baselines based on a set of time periods may also be created, where the template can be used to create a baseline for each of the set of time periods. A moving window baseline may be created having an associated time window that changes with passage of time, where accordingly the data associated with the baseline may also dynamically change with passage of time.

18 Claims, 11 Drawing Sheets

Related U.S. Application Data

(60) Provisional application No. 60/981,373, filed on Oct. 19, 2007.

(56) References Cited

U.S. PATENT DOCUMENTS

| | | | |
|---|---|---|---|
| 3,344,408 | A | 9/1967 | Singer et al. |
| 3,351,910 | A | 11/1967 | Miller et al. |
| 4,654,806 | A | 3/1987 | Poyser et al. |
| 4,849,879 | A | 7/1989 | Chinnaswamy et al. |
| 4,994,986 | A | 2/1991 | Cihiwsky et al. |
| 5,303,166 | A | 4/1994 | Amalfitano et al. |
| 5,349,662 | A | 9/1994 | Johnson et al. |
| 5,488,648 | A | 1/1996 | Womble |
| 5,623,598 | A * | 4/1997 | Voigt ............... G06F 11/321 345/440 |
| 5,729,736 | A | 3/1998 | Gomi et al. |
| 5,734,884 | A | 3/1998 | Eberhard et al. |
| 5,778,350 | A | 7/1998 | Adams et al. |
| 5,781,703 | A | 7/1998 | Desai et al. |
| 5,796,633 | A | 8/1998 | Burgess et al. |
| 5,872,976 | A | 2/1999 | Yee et al. |
| 5,905,868 | A | 5/1999 | Baghai et al. |
| 5,960,423 | A | 9/1999 | Chaudhuri et al. |
| 6,003,022 | A | 12/1999 | Eberhard et al. |
| 6,029,163 | A | 2/2000 | Ziauddin |
| 6,035,306 | A | 3/2000 | Lowenthal |
| 6,052,694 | A | 4/2000 | Bromberg |
| 6,223,171 | B1 | 4/2001 | Chaudhuri et al. |
| 6,282,570 | B1 | 8/2001 | Leung et al. |
| 6,311,175 | B1 | 10/2001 | Adriaans et al. |
| 6,363,282 | B1 | 3/2002 | Nichols et al. |
| 6,389,430 | B1 | 5/2002 | Parker |
| 6,434,714 | B1 | 8/2002 | Lewis et al. |
| 6,467,052 | B1 | 10/2002 | Kaler et al. |
| 6,510,419 | B1 | 1/2003 | Gatto |
| 6,553,369 | B1 | 4/2003 | Guay et al. |
| 6,615,222 | B2 | 9/2003 | Hornibrook et al. |
| 6,665,815 | B1 | 12/2003 | Goldstein et al. |
| 6,671,830 | B2 | 12/2003 | Kaler et al. |
| 6,691,254 | B2 | 2/2004 | Kaler et al. |
| 6,766,318 | B1 | 7/2004 | Guay et al. |
| 6,775,676 | B1 | 8/2004 | Briam et al. |
| 6,792,460 | B2 | 9/2004 | Oulu et al. |
| 6,801,903 | B2 | 10/2004 | Brown et al. |
| 6,804,627 | B1 | 10/2004 | Marokhovsky et al. |
| 6,901,582 | B1 | 5/2005 | Harrison |
| 6,952,692 | B1 | 10/2005 | Bhattiprolu et al. |
| 6,954,717 | B2 | 10/2005 | Boldt et al. |
| 6,955,302 | B2 | 10/2005 | Erdman, Jr. |
| 6,983,257 | B2 | 1/2006 | Gatto |
| 7,051,013 | B2 | 5/2006 | Horman et al. |
| 7,085,786 | B2 | 8/2006 | Carlson et al. |
| 7,089,347 | B2 | 8/2006 | Mogi et al. |
| 7,093,169 | B2 | 8/2006 | Merriam |
| 7,139,749 | B2 | 11/2006 | Bossman et al. |
| 7,292,961 | B2 | 11/2007 | Dias et al. |
| 7,376,682 | B2 | 5/2008 | Ramacher et al. |
| 7,664,798 | B2 | 2/2010 | Wood et al. |
| 7,672,923 | B1 | 3/2010 | Reed |
| 8,560,504 | B2 * | 10/2013 | Parker ............... G06F 17/3089 707/634 |
| 8,990,811 | B2 | 3/2015 | Feng et al. |
| 2002/0065833 | A1 | 5/2002 | Litvin |
| 2002/0087587 | A1 | 7/2002 | Vos et al. |
| 2002/0091708 | A1 | 7/2002 | Vos et al. |
| 2002/0165892 | A1 * | 11/2002 | Grumann ............ G06F 11/34 718/100 |
| 2002/0173997 | A1 | 11/2002 | Menard et al. |
| 2002/0178416 | A1 | 11/2002 | Chen et al. |
| 2003/0120620 | A1 | 6/2003 | Fromherz et al. |
| 2004/0044500 | A1 | 3/2004 | Lu |
| 2004/0044700 | A1 | 3/2004 | Fisher et al. |
| 2004/0059704 | A1 | 3/2004 | Hellerstein et al. |
| 2004/0064544 | A1 | 4/2004 | Barsness et al. |
| 2004/0098265 | A1 | 5/2004 | Kelly et al. |
| 2005/0021306 | A1 * | 1/2005 | Garcea ............... G06F 11/3447 702/186 |
| 2005/0055673 | A1 | 3/2005 | Dias et al. |
| 2005/0086195 | A1 | 4/2005 | Tan et al. |
| 2005/0086246 | A1 | 4/2005 | Wood et al. |
| 2005/0086263 | A1 | 4/2005 | Ngai et al. |
| 2005/0097607 | A1 | 5/2005 | Kummer et al. |
| 2005/0103874 | A1 | 5/2005 | Erdman, Jr. |
| 2005/0138168 | A1 | 6/2005 | Hoffman et al. |
| 2005/0278381 | A1 | 12/2005 | Diao et al. |
| 2006/0218450 | A1 | 9/2006 | Malik et al. |
| 2006/0229963 | A1 * | 10/2006 | Creager ............... G06Q 40/06 705/35 |
| 2006/0294589 | A1 | 12/2006 | Achanta et al. |
| 2007/0022192 | A1 | 1/2007 | Nguyen et al. |
| 2007/0241882 | A1 * | 10/2007 | Panttaja ............... G08G 1/20 340/521 |
| 2007/0294399 | A1 | 12/2007 | Grossner et al. |
| 2009/0103700 | A1 | 4/2009 | Aguirre et al. |

FOREIGN PATENT DOCUMENTS

| | | |
|---|---|---|
| WO | 02/06949 A2 | 1/2002 |
| WO | 02/37061 A1 | 3/2002 |

OTHER PUBLICATIONS

Chaudhuri, Surajit "Self-Managing DBMS Technology at Microsoft," Microsoft Research, Sep. 1, 2004, 35 pages.
Doppelhammer et al. "Database Performance in the Real World—TPC-D and SAP R/3—," ACM, 1997, pp. 123-134.
Hagmann et al. "Performance Analysis of Several Back-End Database Architectures," ACM, 1986, vol. 11, No. 1, pp. 1-26.
IBM Technical Disclosure Bulletin, "Software Monitor for Performance Tuning a Virtual Memory Computer System," 1973, vol. 15, Issue No. 12. pp. 3730-3733.
Lightsone et al. "Toward Autonomic Computing with DB2 Universal Database," Sigmod Record, 2002, vol. 31, No. 3, pp. 55-61.
Lightstone et al. "Autonomic Computing for Relational Databases: The Ten-Year Vision," IEEE, 2003, pp. 419-424.
Lohman et al "Smart: Making DB2 (More) Autonomic," Proceedings of the 28th VLDB Conference, Hong Kong, China, 2002, 3 pages.
Ryu et al. "Analysis of Database Performance with Dynamic Locking," Journal of the Associates for Computing Machinery, 1990, vol. 37, No. 3, pp. 491-523.
Stonebraker, Michael et al. "Performance Enhancements to a Relational Database System," ACM Transactions on Database Systems, 1983, vol. 8, No. 2, pp. 167-185.

* cited by examiner

Creating Baselines though the use of Baseline Templates

CREATING COMPOSITE BASELINES BASED ON A PLURALITY OF DIFFERENT BASELINES

CROSS-REFERENCES TO RELATED APPLICATIONS

This application is a divisional of application Ser. No. 12/111,011, filed Apr. 28, 2008, which claims the benefit and priority under 35 U.S.C. 119(e) of Application No. 60/981,373, filed Oct. 19, 2007, the entire contents of which are herein incorporated by reference for all purposes.

BACKGROUND OF THE INVENTION

The present invention relates to creating baselines, and more particularly to techniques that enable creation and use of dynamic baselines that provide enhanced capabilities.

An essential task of an administrator of any system, such as a software system, is to be able to detect, diagnose, and tune performance problems that may occur in the system. These systems may include software systems, computer server systems, computer network systems, telephony communication systems, etc. As an example, for a product instance of a software system such as a database system (for example, database systems provided by Oracle™ Corporation of Redwood Shores, Calif.), it is very useful to know how the product instance is performing at a certain time compared with another time.

In order to carry out such comparisons, users need to capture and store performance metrics data for various interesting time periods. Having access to baselines of performance metrics data allows users to access and compare a current set of performance metrics data against other sets of performance metrics data captured at other times. A baseline is a construct for specifying a time period of interest in which performance metrics data are captured over the time period. Conventionally, a baseline has been restricted to specify time periods that are static in nature. Further, baselines have been restricted to time periods in the past. These limitations have proven to be quite restrictive. Comparisons of current performance metrics against static and often outdated performance baselines can dramatically reduce an administrator's ability to detect, diagnose, and tune performance problems that may occur in a software system.

In light of the above, it is desirable to provide a more flexible and adaptive approach to defining, capturing, and maintaining performance metrics baselines.

BRIEF SUMMARY OF THE INVENTION

Embodiments of the present invention provides techniques that improve manageability of systems. Techniques are provided for creating different types of baselines that are more flexible and dynamic in nature. According to an embodiment, techniques for creating a future-based baseline is provided. The techniques provide for receiving time information defining a period of time for a baseline where a portion of the period of time is temporally in the future. A baseline may be created based on such time information. Once the baseline is created, metrics data to be associated with the baseline may then be determined based upon the time information.

Depending on the embodiment, the time information may further define an additional period of time, where the period of time and the additional period of time may be temporally contiguous or non-contiguous. The techniques may further provide for receiving a criterion for the baseline. In such cases, the metrics data to be associated with the baseline may further be filtered to satisfy the criterion.

According to an embodiment, techniques for creating a composite baseline is provided. The techniques may provide for receiving information that identify a group of baselines. Based upon the information a composite baseline can be created. Once the baseline is defined, metrics data to be associated with the plurality of baselines may then be determined based in part upon the time information.

Depending on the specific embodiment, time information defining a period of time can be further received. The metrics data to be associated with the composite baseline may then be further filtered to satisfy the time information. According to an embodiment, a criterion for the composite baseline may also be further received. The metrics data that are to be associated with the composite baseline may then be further filtered to satisfy the criterion.

According to an embodiment, techniques for creating baselines using baseline templates are provided. As a first step, baseline templates that can be used to define how baselines are to be created are defined and created. The next step may involves receiving time information relating to a baseline template. Based on the time information, a set of time periods can be derived from the baseline template. The template defines a method for creating baselines. After receiving the time information from the baseline template, a baseline may then be created for each of the set of time periods. Next, metrics data to be associated with each baseline may be determined for each of the plurality of time periods.

A moving window baseline may be created having an associated time window that changes with passage of time; accordingly the data associated with the baseline may also dynamically change with passage of time. A future-based baseline may be created having an associated time window, wherein at least a portion of the time window is in the future at the time when the baseline is defined. A baseline may be created that is a composite of multiple baselines. In general, baselines may have one or more time periods associated with them. The time periods may be either contiguous or non-contiguous. A template for creating a set of baselines based on a set of time periods may also be defined and used.

According to an embodiment, techniques for creating a moving windows baseline in combination with any of several techniques described above is provided. The techniques may provide for receiving time information defining a time window. The time window may be defined to correspond to different periods of time as time progresses. After the time window is specified, a baseline based upon the time information may be created. According to an embodiment, the time window may specify a first period of time. A first metrics data to be associated with the baseline is then determined based upon the first period of time.

As time progresses, the time window may specify a second period of time. A second metrics data to be associated with the baseline is then determined based upon the second period of time. Depending on how much time has progressed, the second metrics data may include metrics data that is not included in the first metrics data. The techniques may further include receiving a criterion for the baseline. Metrics data to be associated with the baseline may then be further filtered to satisfy the criterion.

The time window of a baseline according to an embodiment may be defined to correspond to a period of time of "N" days. As time progresses, the "N" days is automatically updated. The frequency by which the time window is updated can be predetermined and programmed. for example, the time window may be automatically updated once every predetermined time interval as time progresses. In general, an additional time information may be included to define an additional time window. According to the embodiment, the time window and the additional time window may be temporally contiguous or non-contiguous, depending on the specific embodiment.

The foregoing, together with other features, embodiments, and advantages of the embodiments of the present invention, will become more apparent when referring to the following specification, claims, and accompanying drawings.

DETAILED DESCRIPTION OF THE INVENTION

Figure 1:
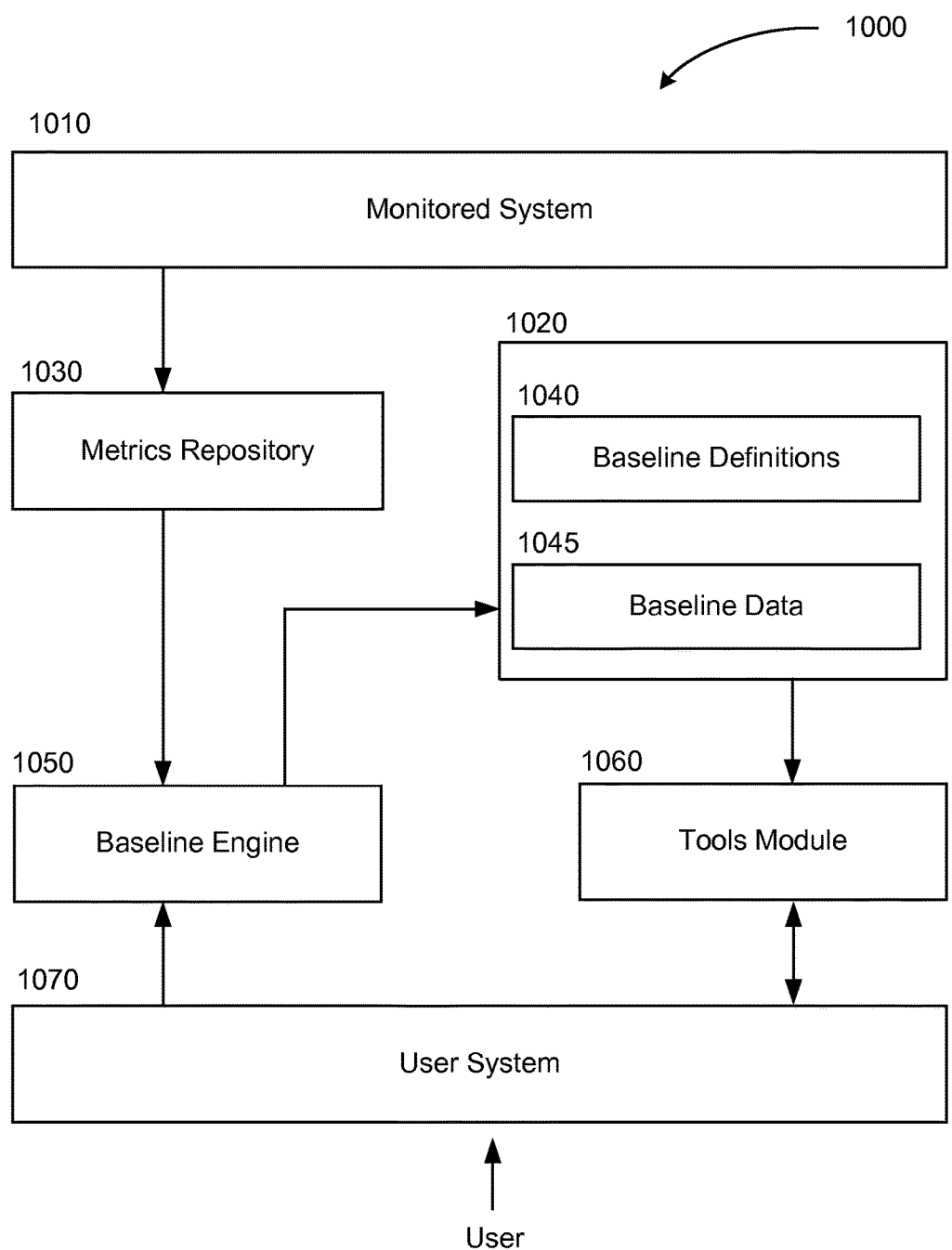
FIG. 1 is a simplified illustration of a system for creating a baseline according to an embodiment of the invention.

In the following description, for the purposes of explanation, specific details are set forth in order to provide a thorough understanding of the invention. However, it will be apparent that the invention may be practiced without these specific details.

Embodiments of the present invention provide techniques for defining and using various novel types of baselines. A baseline is a construct for specifying a time period of interest. A baseline is defined by an identifier (e.g., a baseline name) and a period of time. A set of performance metrics data corresponding to the period of time captured for a monitored system may then be associated with the baseline. In general, performance metrics data may comprise performance metrics captured for a system such as a software instance, a network, a group of servers, and the like. For purposes of this application, the system for which performance metrics data is captured is referred to as a "monitored system."

Various different types of performance metrics may be captured for a monitored system. Examples of performance metrics include CPU load, I/O traffic, available bandwidth, available storage. etc. The performance metrics data for a monitored system may be captured on a continual periodic basis (e.g., every second, every minute, at a certain time every day, once a week, etc.). The data may also be captured in response to an event, for example, when there is a critical error in the system, when the response time of the monitored system drops below a threshold, etc.

Baselines may be used for various different purposes such as for detecting, diagnosing, and tuning performance problems that may occur in any of several systems being monitored. For example, baselines may be used as a basis for comparisons of data corresponding to different time periods. In one embodiment, a baseline provides a tool for a system administrator to better monitor and manage a monitored system. Baselines may thus be used for monitoring, tuning, and managing various software system products.

Using baselines, performance metrics data captured at some time may be compared with a current performance metrics measurement to determine a current state of a system. For example, an administrator may set up a baseline to be associated with performance metrics data and performance metrics statistics captured over a period of time of normal operation ("good period") and another baseline to be associated with performance metrics data and performance metrics statics captured over a period with performance problems (the "trouble period"). Using baselines, the administer may compare a current set of performance metrics data against the normal baseline and the trouble baseline to better monitor, detect, and diagnose a potential current problem.

In general, many uses exist for baselines according to various embodiments of the invention. According to an embodiment, baselines can be created for diagnosing and tuning performance problems related to monitored systems. Baselines can be created for understanding relative values for statistics. Baselines can also be created to detect unexpected workload changes. Baselines can be used for analyzing the performance impact of changes to monitored systems such as application changes or version upgrades or monitoring and/or dealing with normal/expected system performance drifts due to business/demand increases. Other uses include monitoring and dealing with normal/expected system performance peak uses arising from load spikes such as those associated with daily trends (e.g. 9-10 am peak e-mail checking usage) or more seasonal variations (e.g., holiday shopping load on web server). Baselines can be created to detect and manage pending performance problems. Baselines can be created to more dynamically carry out capacity planning.

FIG. 1 is a simplified block diagram of a system 1000 for creating a baseline according to an embodiment of the invention. As depicted in FIG. 1, system 1000 includes a monitored system 1010, a baseline repository 1020, a metrics repository 1030, a baseline engine 1050, a tools module 1060, and a user system 1070.

Monitored system 1010 represents a system that is monitored and for which performance metrics data is captured. Monitored system 1010 may be a software system, a computer server system, a computer network system, a telephony communication system, etc. According to an embodiment, monitored system 1010 is a product instance of a software system such as a database system (e.g., a data system instance provided by Oracle Corporation™ of Redwood Shores, Calif.).

Metrics repository 1030 is used to store performance metrics data gathered from monitored system 1010. Various different types of performance metrics data may be captured for monitored system 1010. The performance metrics data gathered may be captured on a periodic basis (e.g., every minute, every day, etc.) or may be captured upon the occurrence of one or more events. According to an embodiment, a group of performance metrics data captured at a time can be defined to make up a snapshot of monitored system 1010. As time progresses, a set of snapshots, each of which can be uniquely defined by a unique id and be retrieved by the unique id, can be captured and stored periodically for metrics repository 1030.

Baseline repository 1020 is a repository system adapted to store data related to baselines. As previously indicated, a baseline can be generally defined by a baseline name and a time period associated with the baseline. Baseline repository 1020 may be configured to store baseline definitions 1040 and baseline data 1045. Baseline definitions 1040 include information that defines one or more baselines. Baseline definitions 1040 may also include other information for a baseline such as an expiry time, if any, associated with the baseline, information identifying a creator of the baseline, information identifying a time when the baseline was created, and the like. The baseline definitions stored may include definitions for any of various types of baselines, including but not limited to moving windows baselines, composite baselines, future-based baselines, non-contiguous baselines, and other types of baselines (to be described in more detail below).

Baseline data 1045 represents performance metrics data that is associated with baselines defined by baseline definitions 1040. Examples of performance metrics include CPU usage, network usage, error counts, page fault counts, etc. In one embodiment, for each baseline, performance metrics data is determined dynamically for the baseline based upon the time period defined for the baseline. For example, if a baseline specifies that performance metrics data from the preceding five days are associated with the baseline, a query for the performance metrics data will result in a dynamic search of metrics repository 1030 for all performance metrics data gathered in the last five days.

According to another embodiment, performance metrics data may be stored as part of baseline data 1045. For example, if a baseline specifies that performance metrics data from the preceding five days are associated with the baseline, a query for the performance metrics data will retrieve result in a direct fetching of the performance metrics data as part of the baseline data 1045. In an alternative embodiment, baseline data 1045 includes pointers that identifies performance metrics data stored in metrics repository 1030 to be associated with the baseline. For example, if a baseline specifies that performance metrics data from the preceding five days are associated with the baseline, a query for the performance metrics data will retrieve in a fetching of the performance metrics data from metrics repository 1030 through the pointers stored as part of the baseline data 1045.

A user may define a baseline using user system 1070. User system 1070 may be adapted to provide an interface that enables a user to define, access, and manipulate baseline-related data and/or performance metrics. Embodiments of various interfaces provided by user system 1070 may include graphical user interfaces, command line interfaces, remote access systems, web interfaces, phone accessed systems, etc. User system 1070 may be provide an interface to tools module 1060, for example, to perform a number of analysis on baselines using one or more tools. In general, user system 1070 may provide an interface for imputing information to system 1000 and for displaying information from system 1000.

According to an embodiment, baseline engine 1050 is configured to perform processing related to baselines. For example, baseline engine 1050 may facilitate receiving baseline definitions from user system 1070 and storing them in baseline repository 1020. Baseline engine 1050 may also be configured to determine and associate performance metrics data from metrics repository 1030 to be associated with each defined baseline.

Tools module 1060 may provide one or more tools for performing analysis related to baselines. Examples of tools include tools for outputting information related to baselines, tools for comparing performance metrics data associated with two or more baselines, tools for generating reports, statistical analysis tools, and alerting and messaging tools for generating alerts or sending messages based upon performance metrics data stored in repository 1030 and/or baselines-related data.

The system depicted in FIG. 1 is merely illustrative of an embodiment of the present invention. Alternative embodiments of the system as illustrated may differ from those depicted in FIG. 1 but will be understood by one of ordinary skill in the art to be encompassed by the current invention. The various components depicted in FIG. 1 may be implemented in software (e.g., program, code, modules, instructions executed by a processor), in hardware, or combinations thereof.

According to an embodiment of the present invention, techniques for creating and using a moving window baseline is provided. A moving window is characterized by a time period that dynamically changes as time progresses. Since the performance metrics data associated with a baseline depends upon the time period for the baseline, the performance metrics data associated with a moving baseline change as time progresses. An example of a moving window baseline is a baseline characterized by a customizable trailing period of time (e.g., last N months, N weeks, N days, N hours, etc.).

Figure 2A:
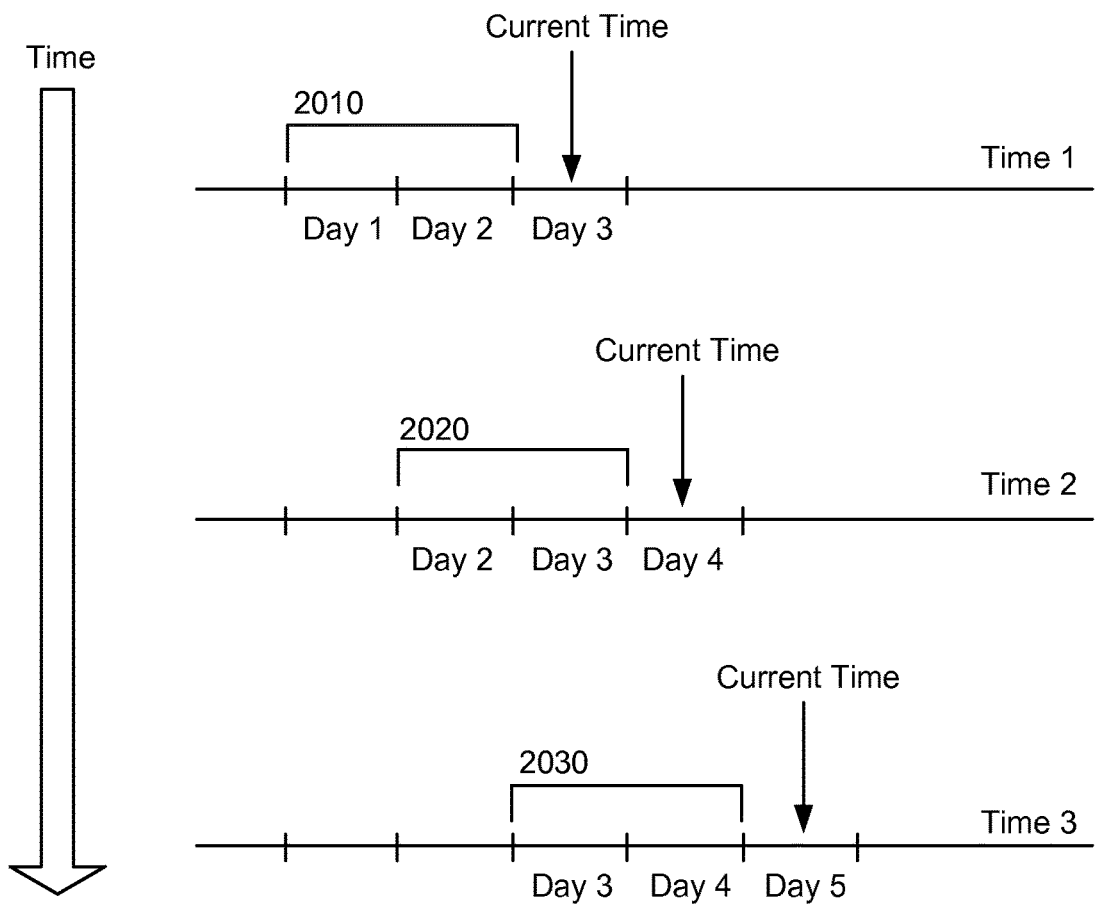
FIG. 2A is a simplified illustration of the process to update a moving time window baseline as time progresses according to an embodiment of the invention.

FIG. 2A is a simplified illustration showing how a moving time window dynamically changes as time progresses according to an embodiment of the present invention. An example of a moving window baseline with a trailing 2-day time window is depicted. At Time 1, when day 3 is the current time, the time window associated with the moving window baseline is a 2-day time window 2010 starting on the first day and ending on the second day. Accordingly, at Time 1, performance metrics data corresponding to the first day and the second day is associated with the baseline. The time window shifts with passage of each day. For example, at a Time 2, when day 4 is now the current time, the updated 2-day time window 2020 associated with the baseline now starts on the second day and ends on the third day. At Time 2, day 1 is now no longer covered by the baseline and a new day four has been added to the baseline. Accordingly, at Time 2, performance metrics data corresponding to the second day and the third day is associated with the baseline. As time further progresses, at Time 3 when day 5 is the current time, the 2-day interval for the baseline now starts on the third day and ends on the fourth day. Accordingly, at Time 3, performance metrics data corresponding to the third day and the fourth day is associated with the baseline.

In the manner described above, the time period associated with a moving window baseline is updated with passage of time. Similarly, the performance metrics data associated with the moving window baseline is also continually updated as time progresses—and as the moving time window is updated.

The above time window has been shown to increment in 1 day intervals. However, in general, the time window can be updated in any time increments. According to an embodiment, the time window is updated once every day. According to other embodiments, the time window can be updated in any of other time increments, including once every hour, once every minute, etc., depending on the specific embodiment.

Moving window baselines may be used for any of various purposes. In one embodiment, moving window baselines is used for comparing a current performance state of a system against a baseline performance state of the system from a recent past. The baseline depicted in FIG. 2A may be adapted to be used as a constantly updated set of recent snapshots of a system's performance metric. Such a set of snapshots would be useful as a baseline to which to compare a system's current performance metrics.

Figure 2B:
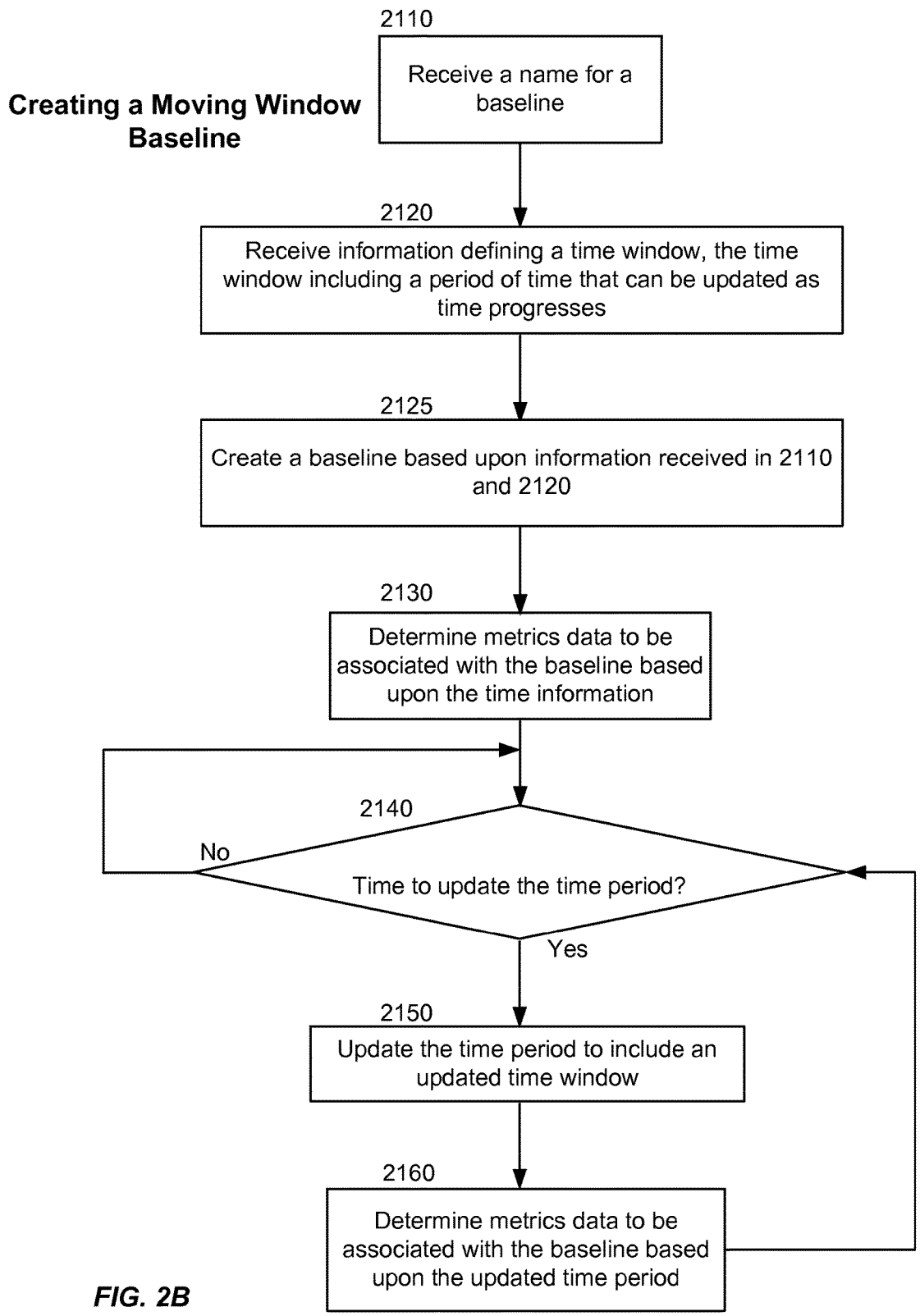
FIG. 2B is a simplified diagram of a technique for creating a moving baseline.

FIG. 2B is a simplified diagram of a method for creating and associating information with a moving window baseline according to an embodiment of the invention. The processing depicted in FIG. 2B may be performed by hardware modules, software modules (e.g., program, code, instructions executed by a processor), or combinations thereof. In one embodiment, the processing may be performed by baseline engine 1050 depicted in FIG. 1.

As shown in FIG. 2B, information is received identifying a name for the baseline (step 2110). Time information received for defining a moving time window include a period of time that can be updated as time progresses. The moving time window is associated with the baseline (step 2120). For example, the moving time window may define a window specifying the last "N" days. A baseline is created based upon information received in steps 2110 and 2120 (step 2125). Based upon the time information, performance metrics data to be associated with the baseline is determined (step 2130). In one embodiment, as part of 2130, the performance metrics data to be associated with the baseline may be extracted from the metrics repository and stored in the baseline repository as part of baseline data. In an alternative embodiment, the performance metrics data may be associated with the baseline by storing information (e.g., pointers to the performance metrics data in the metrics repository) identifying the data to be associated with the baseline.

According to an embodiment, the determination of performance metrics data to be associated with the baseline may take place soon after time information relating to the time period is received. In an alternative embodiment, the determination of performance metrics data to be associated may also take place later dynamically in response to a query for performance metrics data associated with the baseline.

As time progresses, a check may be made to determine if the time window associated with the baseline needs to be updated (step 2140). Various techniques can be used to determine whether time period associated with the baseline needs to be updated. According to one technique, a timer may be periodically polled to determine whether sufficient time has passed to necessitate an update of the time window associated with the baseline. According to another technique, the assessment can be based on an event-driven technique, where the baseline system is notified when a certain time has been reached and the time window is to be updated. Other techniques may also be used.

If it is determined that the time period needs to be updated, the time window for the baseline is updated to cover a new period of time (step 2150). The updating in 2150 may include updating the start time and end time of the time window associated with the baseline. Using the baseline depicted in FIG. 2A as an example, upon determining that it is Time 2, the time window with a prior start time of Day 1 and a prior end time of Day 2 is updated such that the new start time is Day 2 and the new end time is Day 3.

Performance metrics data to be associated with the baseline may be based upon the updated time period (step 2160). In one embodiment, as part of 2160, the performance metrics data is associated with the baseline, where the actual data is determined based upon the updated time window. The performance metrics data may be extracted from the metrics repository and stored in the baseline repository as part of baseline data. In an alternative embodiment, the performance metrics data determined in 2160 may be associated with the baseline by storing information (e.g., pointers to the performance metrics data in the metrics repository) identifying the data to be associated with the baseline.

In the manner described above, the time window associated with a moving window baseline can be updated with passage of time. In one example, performance metrics data associated with the baseline is dynamically determined and updated as the time window is updated. As a result, the performance metrics data associated with a moving window baseline is automatically and dynamically updated with passage of time.

According to an embodiment of the present invention, a future-based baseline may be created that is characterized by a time period that includes at least a portion of time in the future. For a future-based baseline, at least the end time defining the time period for the baseline is in the future from a present time. The start time defining the time period may also be in the future, in which case the entire time period associated with the baseline is in the future. For example, if the present time is Feb. 1, 2008, a future-based baseline may be created such that the time period for the baseline is the month of March 2008.

Figure 3A:
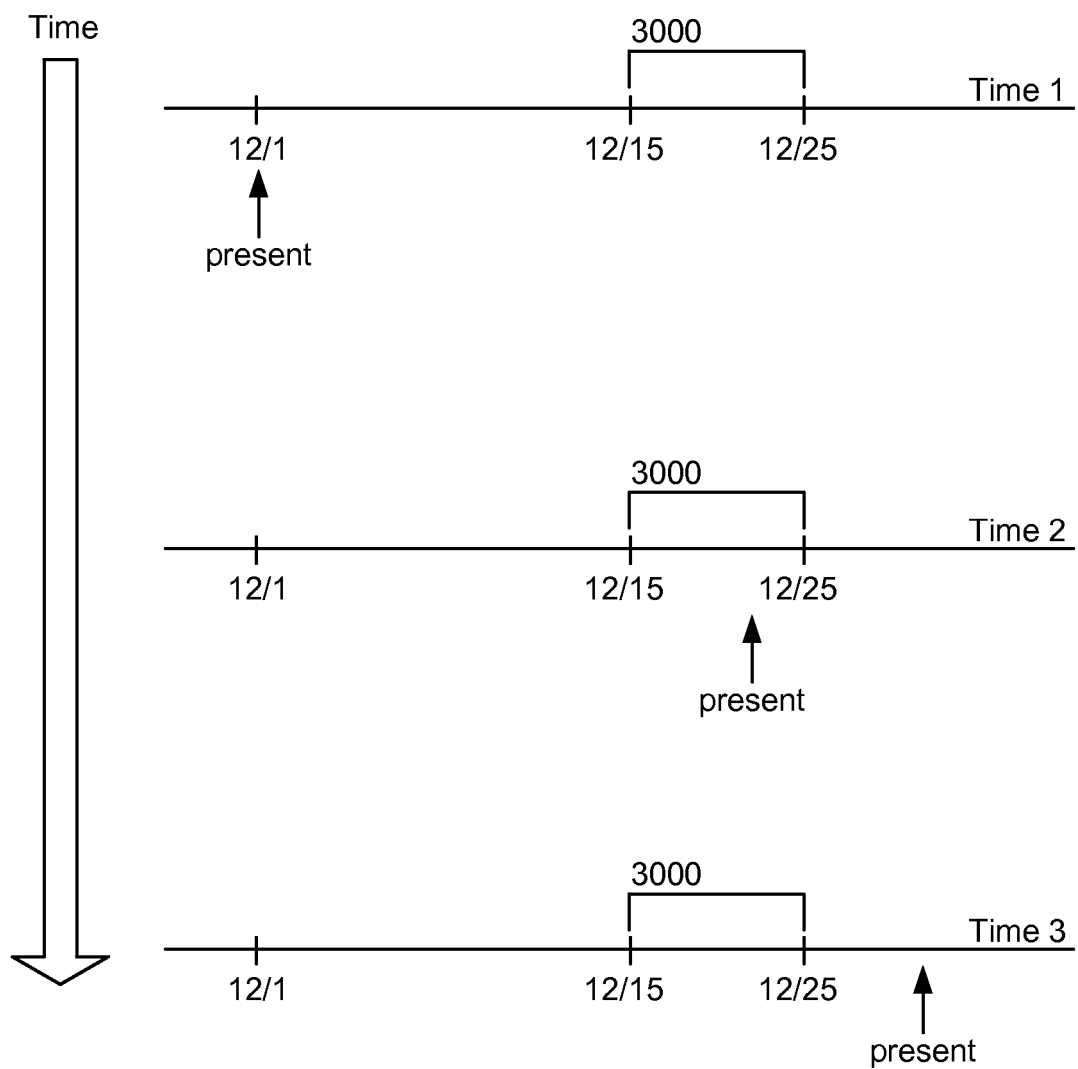
FIG. 3A is a simplified diagram of a future-based baseline according to another embodiment of the invention.

FIG. 3A is a simplified diagram depicting a future-based baseline 3000 according to another embodiment of the invention. As depicted in FIG. 3A, at Time 1 when the present time is December 1, future-based baseline 3000 may be created having an associated time window defined to be December 15 through December 25 (the Christmas shopping season). Embodiments of the present invention thus provide the ability to create a baseline wherein at least a portion of the time window associated with the baseline is in the future. A baseline may thus be defined even though the performance metrics data to be associated with the baseline has not yet been captured.

As depicted in FIG. 3A, as time progresses, a part or all of the time window associated with a future-based baseline may start falling into the past. For example, at Time 2 when the present time is sometime between December 15 and December 25, a portion of the time window associated with baseline 3000 is in the past and a portion is in the future. As time further progresses, at Time 3, baseline 3000 is associated with a time window where all of the time window is in the past.

A future-based baseline may have several uses. In one embodiment, a future-based baseline may allow a user to specify baseline whose associated time period is based on a future condition or event of a monitored system. For example, an online merchant may in advance define a baseline (e.g., baseline 3000 depicted in FIG. 3A) for Christmas shopping time when the online merchant's system is likely to come under heavy load. A future-based baseline may also be defined for a future time period when a CPU load of a monitored system reaches above 90%. In this scenario, the next time the monitored system reaches above 90% load, a time window is defined to be associated with this time interval. Similarly, a baseline can be programmed to define a future time period based on other performance metrics, such as when an I/O load exceeds a certain threshold or when the error count exceeds a certain tolerance. Time windows may also be defined to be based off certain events.

Figure 3B:
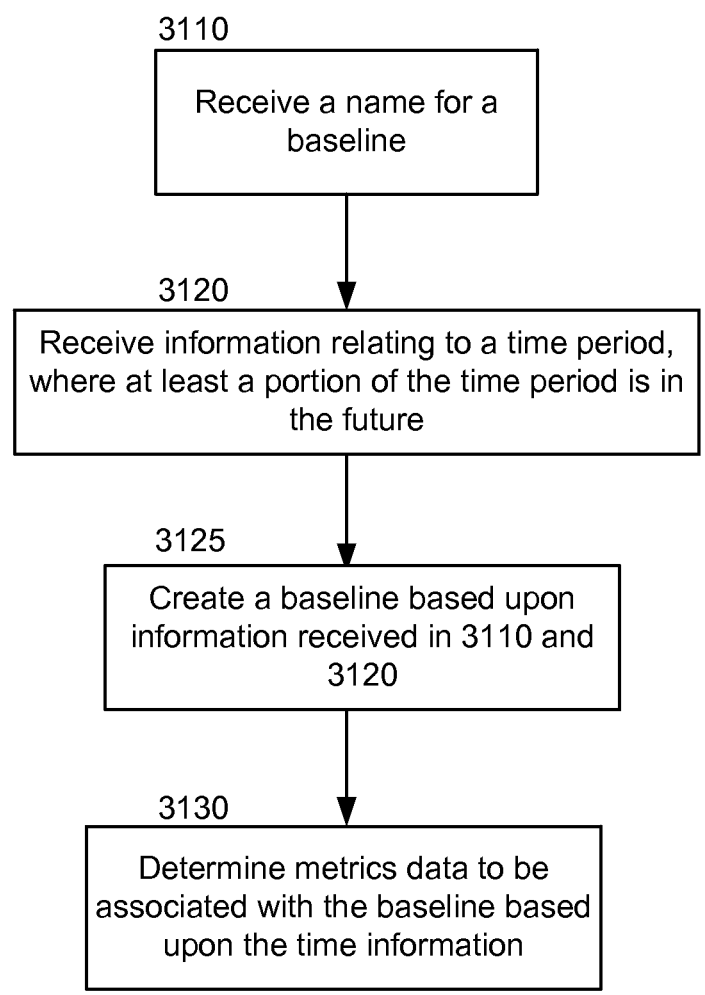
FIG. 3B is a simplified diagram of a technique for creating a future-based baseline.

FIG. 3B is a simplified diagram depicting a method for creating a future-based baseline according to an embodiment of the invention. The processing depicted in FIG. 3B may be performed by hardware modules, software modules (e.g., program, code, instructions executed by a processor), or combinations thereof. In one embodiment, the processing may be performed by baseline engine 1050 depicted in FIG. 1.

As depicted in FIG. 3B, information is received identifying an identifier (e.g., a name) for a baseline (step 3110). Time information that specifies a time period for the baseline is then received, wherein at least a portion of the time period is in the future (step 3120). According to an embodiment, the time period for a future-based baseline may be a static time window (e.g., December 15 to December 25, with the present time some time prior to December 15), a moving time window (e.g., a window between the present and 5 days into the future), or even a group of non-contiguous time windows (e.g., the first day of each week for the next four weeks)—so long as a portion of the time period covers a time period in the future. The information defining a future-based baseline may be stored as part of baselines definitions 1040 depicted in FIG. 1.

A baseline is created based upon information received in steps 3110 and 3120 (step 3125). In one embodiment, performance metrics data to be associated for a future-based baseline can be determined after at least a portion of the future-based baseline time window falls in the past (step 3130). Accordingly, in order to determine performance metrics data to be associated with a future-based baseline, a portion of the time window of the baseline that is in the past is first determined. That data is then associated with the baseline. As time progresses, the baseline is updated as performance metrics data in the future is determined and associated with the baseline.

In general, a baseline, including a future-based baseline, is typically associated with one contiguous interval of time—i.e. one time window. However, a baseline can also be associated with multiple windows of times that are not contiguous. According to an embodiment of the present invention, a baseline may be defined such that several non-contiguous windows of times are associated with the baseline. Such a baseline may be referred to as a "non-contiguous" baseline. For example, a baseline may be created with a time period defined as "9 AM-12 PM every weekday of the current week." Assuming that the present time is a Wednesday afternoon, the above-specified time period defines a group of 7 non-contiguous time windows: Sunday 9 AM-12 PM, Saturday 9 AM-12 PM, Friday 9 AM-12 PM, and Thursday 9 AM-12 PM being in the future, and Wednesday 9 AM-12 PM, Tuesday 9 AM-12, and Monday 9 AM-12 being the past. Another example of a non-contiguous time baseline is a baseline associated with a time period defined by all holiday shopping seasons from the current year. In this case, the time period might define a period around Thanksgivings and a period around Christmas. In summary, the non-contiguous time windows associated with a non-contiguous baseline may lie in the past, in the future, or lie both in the past and the future.

According to an embodiment of the present invention, a baseline may be created that is a composite of multiple baselines. This baseline may be referred to as a "composite" baseline. A composite baseline is thus a baseline that comprises other baselines. According to an embodiment, the baselines associated together by a composite baseline could be of different types including moving window baselines, future-based baselines, non-contiguous time baselines, and even other composite baselines.

Figure 4A:
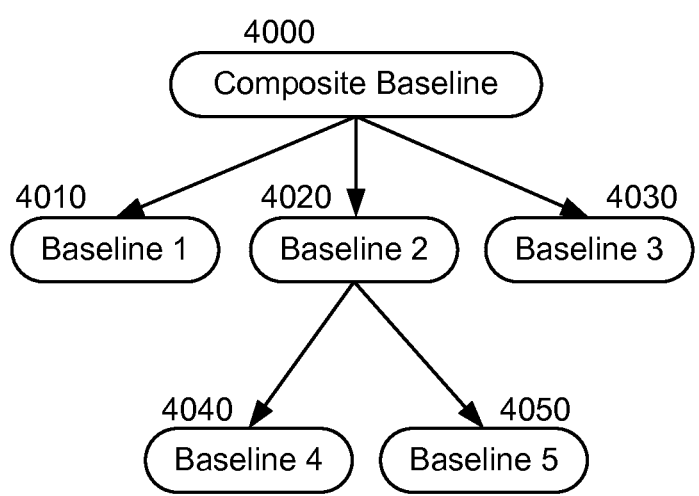
FIG. 4A is a simplified illustration of a composite baseline adapted to group together a set of baselines according to an embodiment of the invention.

FIG. 4A is a simplified illustration of a composite baseline 4000 according to an embodiment of the invention. Baseline 4000 is a composite of a first baseline 4010, a second baseline 4020, and a third baseline 4030. As depicted in FIG. 4A, second baseline 4020 is also a composite baseline, which is further associated with a fourth baseline 4040 and a fifth baseline 4050.

According to an embodiment, a composite baseline such as baseline 4000 may be used to group together a set of baselines. Once performance data is associated with a composite baseline, the composite baseline may be used and analyzed just like any ordinary baseline. Analysis of the merged time periods and the combined performance metrics data can be carried out like any other time period and groups of performance metrics data.

According to one embodiment, an envelop time period may be associated with the composite baseline. The time period of the baseline is determined from the merger of the time periods associated with the set of baselines. Before being associated with the composite baseline, the merged period is processed where portions that fall outside the envelop time period are deleted. The performance metrics data associated with the set of baselines are merged and associated with the composite baseline.

Figure 4B:
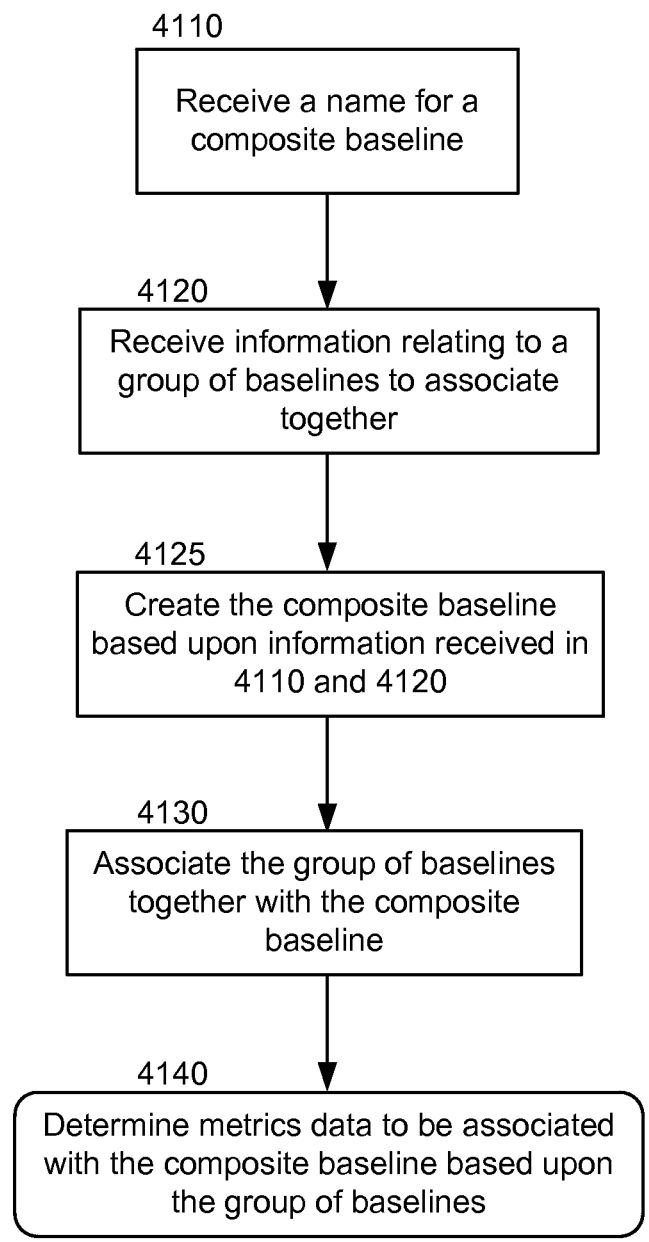
FIG. 4B is a simplified diagram of a technique for creating a composite baseline.

FIG. 4B is a simplified diagram of a method for creating a composite baseline and determining performance metrics data to be associated with the composite baseline according to an embodiment of the present invention. The processing depicted in FIG. 4B may be performed by hardware modules, software modules (e.g., program, code, instructions executed by a processor), or combinations thereof. In one embodiment, the processing may be performed by baseline engine 1050 depicted in FIG. 1.

As depicted in FIG. 4B, name information may be received for identifying a composite baseline (step 4110). Information identifying a group of baselines to be associated with the composite baseline may be received (step 4120). A baseline is created based upon information received in steps 4110 and 4120 (step 4125). In one embodiment, user system 1070 depicted in FIG. 1 may provide an interface that allows a user to associate one or more baselines with the composite baseline. A composite baseline may be created based upon the information received in 4110 and 4120 (step 4130).

Processing may then be performed to determine the performance metrics data to be associated with the composite baseline. According to an embodiment, performance metrics data for the composite baseline may be determined by associating performance metrics data corresponding to each baseline with the composite baseline (step 4140). The performance metrics data associated with the composite baseline thus represents a collection of performance metrics data based on a grouping of baselines. If the performance metrics data for a baseline associated with the composite baseline needs to be updated as time progresses (e.g., for a moving window baseline), then the performance metrics data associated for the composite baseline may also be updated as time progresses.

According to the embodiment, the determination of performance metrics data to be associated with the composite baseline may take place soon after information relating to the group of baselines to be associated has been received. According to another embodiment, the determination of performance metrics data to be associated may take place later dynamically in response to a query for performance metrics data associated with the baseline.

In some composite baselines, no explicit time period may be defined for the composite baseline. Instead, the time period for the composite baseline may be derived from combining the time periods defined for the baselines associated with the composite baseline. In an alternative embodiment, a separate time period may be defined for a composite baseline. For such as composite baseline, the performance metrics data associated with the baseline must further satisfy the specific time period.

In the case where explicit time periods may be defined for the composite baseline, a method for creating a composite baseline may include the following variation. Information is received indicating a name for a composite baseline. Information is received identifying a set of one or more baselines to be associated with the composite baseline. In addition, information is received identifying a time period for the composite baseline. A composite baseline is then created based upon all the information received.

Processing may then be performed, based on all the information received, to determine performance metrics data to be associated. According to an embodiment, the performance metrics data to be associated is first determined by obtaining performance metrics data associated with the set of one or more baselines.

The performance metrics data should satisfy the explicit time constraints of the composite baseline. For example, if a composite baseline is associated with or comprises two baselines, one with a time window of between 8 AM-10 AM and the other with a time window of between 12 PM-1 PM, and if an explicit time period of 8:30 AM-12:30 PM is specifically defined for the composite baseline, the performance metrics data to be associated with the composite baseline will be a subset of the performance metrics data associated with the time windows of the two baselines subject to the explicit time period. More specifically, the performance metrics data will be the performance metrics data combined from the two baselines but with performance metrics data corresponding to 8 AM-8:30 AM and performance metrics corresponding to 12:30 PM-1 PM removed since they fall outside the explicit time period of 8:30 AM-12:30 PM. Consequently, only performance metrics data falling within the time period defined by the composite baseline is associated with the composite baseline.

In general, according to an embodiment, the performance metrics data to be associated with a baseline of any type may determined based on one or more time windows associated with the baseline. Different techniques may be used to map performance metrics data to a time period. In one embodiment, a time period is characterized by a start time $t_s$ and an end time $t_e$. For example, for baseline 3000 depicted in FIG. 3A, $t_s$ is December 15 and $t_e$ is December 25. The performance metrics data that is captured between $t_s$ and $t_e$ of the time window is then mapped to the baseline associated with time period. For baseline 3000, performance metrics data captured between December 15 and December 25 can be mapped to and associated with the baseline with a time period of between December 15 and December 25.

Figure 5A:
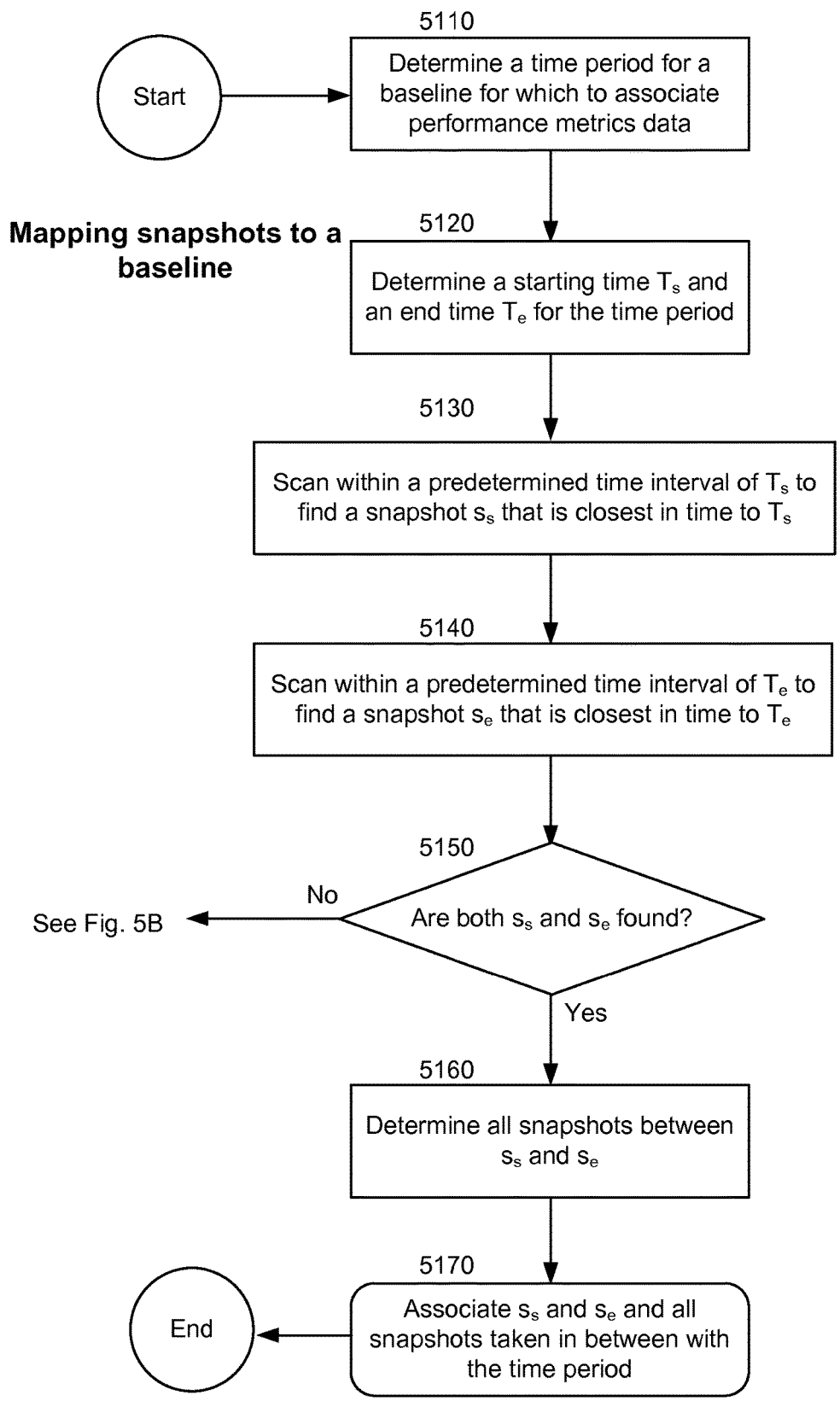
FIGS. 5A and 5B are simplified diagrams of a technique for mapping performance metrics data to a time period of a baseline.
Figure 5B:
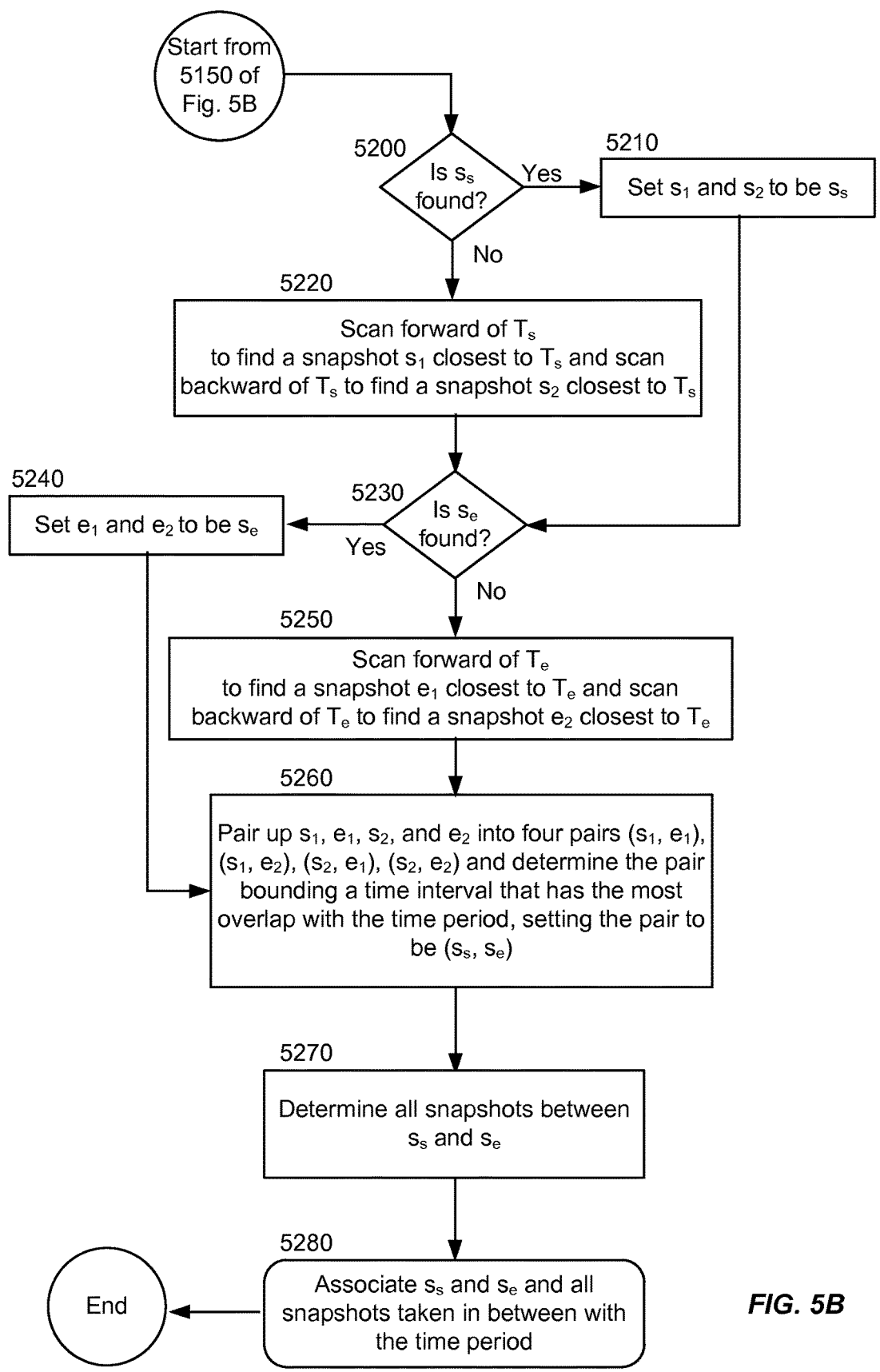

According to an embodiment, a method to mapping performance metrics data is shown in FIG. 5A and FIG. 5B.

According to the embodiment, a series of snapshots are captured and stored on a continual and regular basis. Each of a series of snapshots can be uniquely identifiable by a snapshot id. When a baseline defines one or more time periods for monitoring, a series of snapshots, identified by their snapshot ids, may then be mapped to the one or more time periods.

According to an embodiment, the technique for mapping snapshots to a time period includes determining a time period for a baseline (step S110). After the time period is determined, a starting time $T_s$ and an ending time $T_e$ for the time period is determined (step S120). An attempt is carried out to find a snapshot $s_s$ within a predetermined time interval of $T_s$ (step S130). If multiple snapshots are found within the predetermined time interval, then one snapshot closest to the starting may be selected. An attempt is also carried out to find a snapshot $s_e$ within a predetermined time interval of $T_e$ (step S140). If multiple snapshots are found within the predetermined time interval, then one snapshot closest to the ending time may be selected.

According to an embodiment, a determination is next made regarding whether both the first and second snapshots are found (step S150). If both are found, then a determination of all snapshots between snapshot $s_s$ and snapshot $s_e$ is next carried out (step S160). The set of snapshots including snapshot $s_s$ and snapshot $s_e$ and all snapshots captured between snapshot $s_s$ and snapshot $s_e$ are then associated with the time period (step S170).

If one or both are not found, then an attempt is made to find four versions of the snapshots around the starting time and the ending time. A determination is made whether $s_s$ is found (step S200). If it is found, a snapshot $s_1$ and a snapshot $s_2$ are to be $s_s$ (step S210). If $s_s$ is not found, a determination for a snapshot $s_1$ and a snapshot $s_2$ is carried out to by searching forward for a snapshot closest to $T_s$ and backward around $T_s$ a snapshot closest to $T_s$ (step S220). A determination is next made whether $s_e$ is found (step S230). If it is found, a snapshot $e_1$ and a snapshot $e_2$ are set to be $s_e$ (step S240). If $s_e$ is not found, a determination for a snapshot $e_1$ and a snapshot $e_2$ is carried out to by searching forward a snapshot closest to $T_e$ and backward a snapshot closest to $T_e$ (step S250).

Next, the four sets of snapshots $s_1$, $s_2$, $e_1$, and $e_2$ and paired up four ways to select the pair that bound a time interval that has the most overlap with the time period, setting the pair to be ($s_s$, $s_e$) (step S260). After $s_s$, $s_e$ have been set, then a determination of all snapshots between snapshot $s_s$ and snapshot $s_e$ is next carried out (step S270). The set of snapshots including snapshot $s_s$ and snapshot $s_e$ and all snapshots captured in between are then associated with the time period (step S280).

In general, according to an embodiment, filter criteria may also be specified for any baseline. In the embodiment, performance metrics data associated with the baseline must further satisfy the filter criteria specified for the baseline is associated with the baseline. A filter criterion may be defined based on any attribute or value of the performance metrics data captured for a monitored system for which the baseline is defined. For example, filter criteria may be related to CPU load (e.g., data when the CPU load exceed a threshold), storage capacity, etc. For example, a criteria specifying a 90% CPU Load for last Monday will associate with a baseline a group of performance metrics data captured last Monday when the CPU Load is 90% or higher.

According to an embodiment, an expiration criterion may be associated with any baseline. The criteria may specify a condition based on time or events under which a baseline may be expired for any of several reasons. For example, an administrator may not be interested in a baseline that has not gathered new performance metrics data or that has not been used because such data is considered too out of date. In such cases, the administrator may want to remove data associated with such baselines from the system. Since manually deleting the individual data associated with baselines often constitute too big burden to a system administrator, one way to automate such deletions is to set an expiration time associated with each baseline. Similarly, after a system has been upgraded to a new software or a new operation system, an administrator of a system may not be interested in many of the previously obtained baselines. One way to automate deletions of such obsolete data is to associate an expiration event for each baseline.

According to another embodiment, a baseline may be automatically deleted after a fixed period of time of nonuse. For example, if the baseline has not been used or modified for six months, for example, the baseline may be automatically expired. A baseline may also be automatically deleted after a occurrence or non-occurrence of an event. For example, if a system has been upgraded or software patch installed, a baseline with performance metrics data associated with a prior version of software may be deleted. As another example, if the error count of a monitored system has not exceeded a certain threshold for three weeks, a baseline may also be automatically expired.

In general, according to an embodiment, a baseline may be configured to include a non-contiguous time period defining multiple non-contiguous time periods. For a non-contiguous-based baseline, the performance metrics data associated with the non-contiguous baseline is the performance metrics data corresponding to the non-contiguous time periods associated with the baseline. Accordingly, for a non-contiguous baseline, performance metrics data is determined corresponding to each time period associated with the baseline. The performance metrics data gathered for the multiple time periods is then aggregated and associated with the non-contiguous baseline.

According to the embodiment, the determination of performance metrics data to be associated with the baseline may take place soon after the time period for the baseline is received. In an alternative embodiment, the determination of performance metrics data to be associated with the non-contiguous baseline may take place later dynamically in response to a query for performance metrics data associated with the baseline. A moving window baseline and/or a future-based baseline may also be a non-contiguous baseline.

Figure 6:
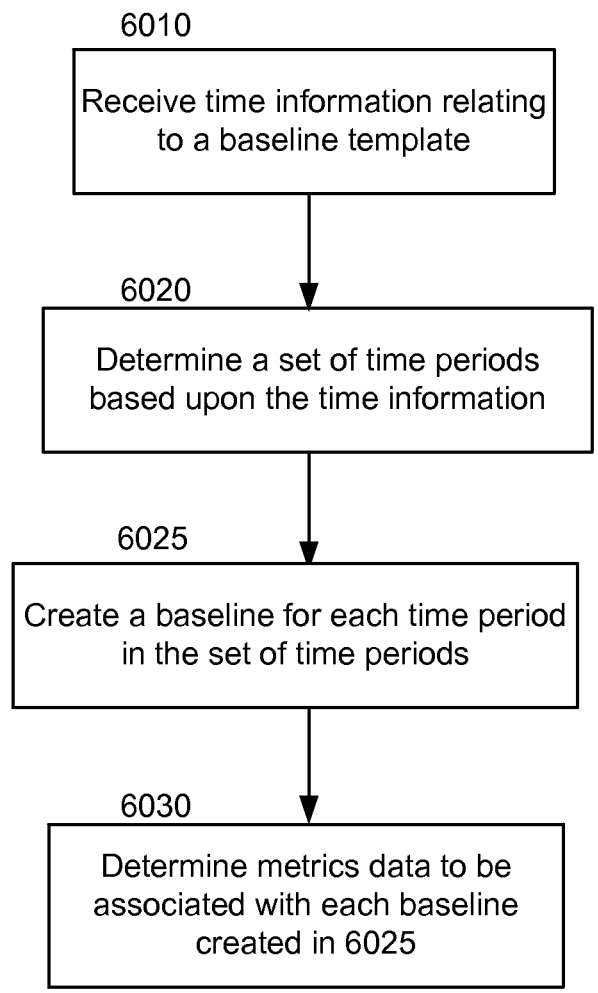
FIG. 6 is a simplified diagram depicting a technique for creating baselines using baseline templates according to an embodiment of the invention.

FIG. 6 is a simplified diagram depicting a technique for creating baselines using baseline templates according to an embodiment of the invention. The techniques depicted in FIG. 6 may be performed by hardware modules, software modules (e.g., program, code, instructions executed by a processor), or combinations thereof. In one embodiment, the processing may be performed by baseline engine 1050 depicted in FIG. 1.

According to an embodiment, a baseline template is defined for creating a set of baselines. A baseline template may specify a time schedule for creating a set of baselines. It may specify the intervals for which each of the set of baselines is to be created. For example, a baseline template may specify that for each of the time periods of between 9 AM to 12 PM of each Monday during the last month a baseline should be created. If there are 4 Mondays in the last month, there will be four baselines created each with a non-contiguous set of time periods, the first of the baselines will be associated with a time period of between 9 AM to 12 PM on the first Monday, the second of the baselines will be associated with a time period of between 9 AM to 12 PM on the second Monday, the third of the baselines will be associated with a time period of between 9 AM to 12 PM on the third Monday, and the fourth of the baselines will be associated with a time period of between 9 AM to 12 PM on the second Monday.

According to an embodiment, the techniques for creating baselines based on baseline templates can also include setting an expiration date for the baselines that are created by the baseline template. In an example, a baseline template might specify that a set of baselines are to be created for each of the last 5 trailing days. On Day 5, five baselines would have been created, one for Day 1, one for Day 2, one for Day 3, one for Day 4, and one for Day 5. One Day 6, the baseline for Day 1 is created, and a new baseline for Day 6 is created. This process for creating a rolling set of baselines can go on indefinitely, according to an embodiment.

As depicted in FIG. 6, one embodiment of a technique for creating a set of baselines using a baseline template is disclosed. The technique includes receiving time information relating to a baseline template (step 6010). The technique can specify, for example, a template to be created for each of the time periods of between 9 AM to 12 PM of each Monday of the last month. Based on the time information associated with the baseline template, a set of time periods is then determined. If there are 4 Mondays in the last month, four time periods will be created, the first which is a time period of between 9 AM to 12 PM on the first Monday, the second of which is a time period of between 9 AM to 12 PM on the second Monday, the third of which is a time period of between 9 AM to 12 PM on the third Monday, and the fourth of which is time period of between 9 AM to 12 PM on the second Monday.

Other types of time information may exist. A slight variation may specify a time period of 9 AM to 12 PM every Monday of the next month. If there are 4 Mondays in the next month, there will be four non-contiguous set of time periods created. Another variation of the above example can specify a time of period of 9 AM to 12 PM every Monday of the current month. In this example, the set of time periods specified may thus potentially include time periods in both the future and the past, depending on the current time. If there are 4 Mondays in the current month, four non-contiguous set of time periods will be created.

In general, time information can specify a set of time periods that are in the past or in the future, or both. The set of time periods may include static time windows (e.g., December 15 to December 25), a moving time window (e.g., between the present and 5 days into the past), or even a group of non-contiguous time windows (e.g., the first day of each week for the next four weeks). The time information relating to a baseline template may be stored as part of baselines definitions 1040 depicted in FIG. 1 or may be stored in a separate part of a system devoted specifically to baseline template, according to another embodiment.

After reception of information relating to a set of time periods, a set of baselines can be created based upon the time information (step 6025). Performance metrics data can then be associated with each of the newly created baselines (step 6030).

Figure 7:
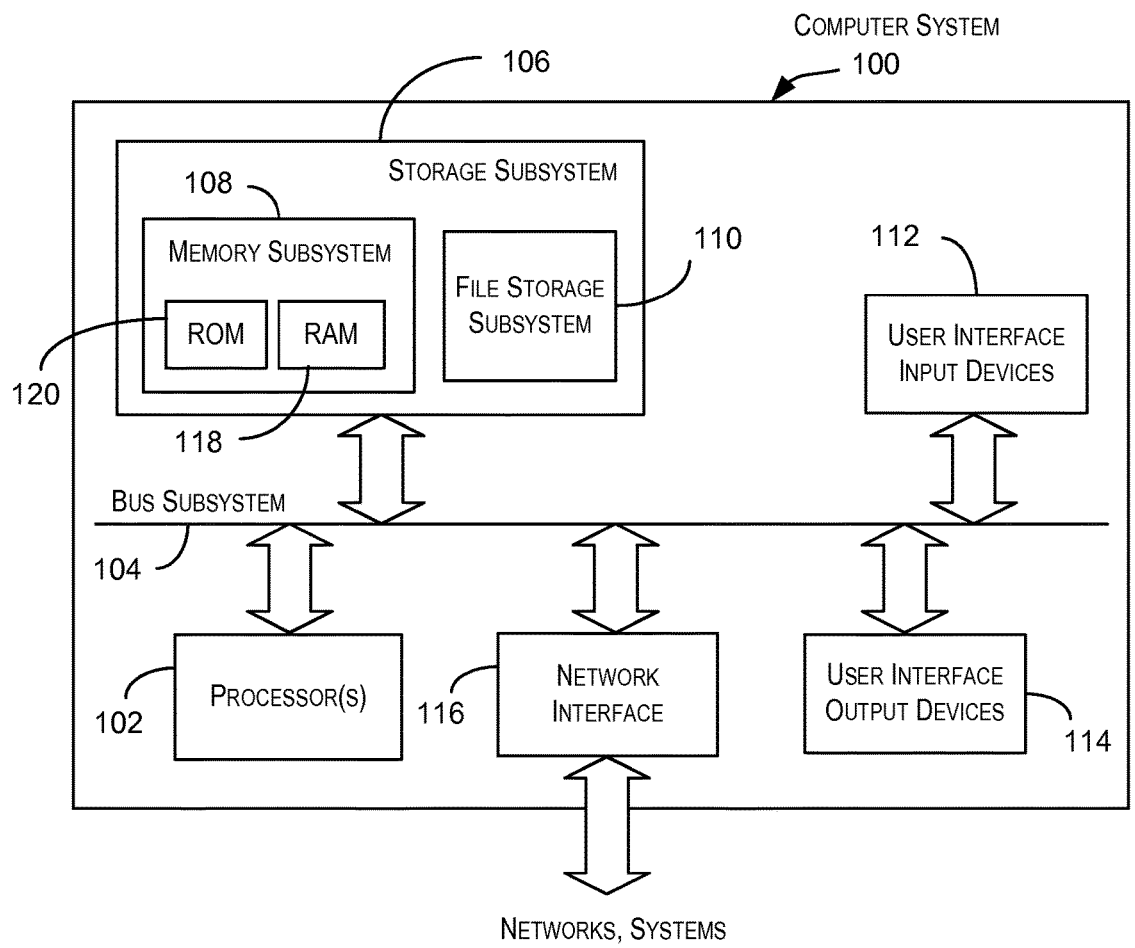
FIG. 7 is a simplified block diagram of a computer system that may be used to practice an embodiment of the various inventions described in this application.

FIG. 7 is a simplified block diagram of a computer system 100 that may be used to practice an embodiment of the various inventions described in this application. As shown in FIG. 7, computer system 100 includes a processor 102 that communicates with a number of peripheral subsystems via a bus subsystem 104. These peripheral subsystems may include a storage subsystem 106, comprising a memory subsystem 108 and a file storage subsystem 110, user interface input devices 112, user interface output devices 114, and a network interface subsystem 116.

Bus subsystem 104 provides a mechanism for letting the various components and subsystems of computer system 100 communicate with each other as intended. Although bus subsystem 104 is shown schematically as a single bus, alternative embodiments of the bus subsystem may utilize multiple busses.

Network interface subsystem 116 provides an interface to other computer systems, networks, and portals. Network interface subsystem 116 serves as an interface for receiving data from and transmitting data to other systems from computer system 100.

User interface input devices 112 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 100.

User interface output devices 114 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 100.

Storage subsystem 106 may be configured to store the basic programming and data constructs that provide the functionality of the present invention. Software (code modules or instructions) that provides the functionality of the present invention may be stored in storage subsystem 106. These software modules or instructions may be executed by processor(s) 102. Storage subsystem 106 may also provide a repository for storing data used in accordance with the present invention. Storage subsystem 106 may comprise memory subsystem 108 and file/disk storage subsystem 110.

Memory subsystem 108 may include a number of memories including a main random access memory (RAM) 118 for storage of instructions and data during program execution and a read only memory (ROM) 120 in which fixed instructions are stored. File storage subsystem 110 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 100 can be of various types including a personal computer, a portable computer, a workstation, a network computer, a mainframe, a kiosk, a server or any other data processing system. Due to the ever-changing nature of computers and networks, the description of computer system 100 depicted in FIG. 7 is intended only as an example for purposes of illustrating the preferred embodiment of the computer system. Many other configurations having more or fewer components than the system depicted in FIG. 7 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented using hardware, software, or combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the inventions.

What is claimed is:

1. A non-transitory computer-readable medium storing a plurality of instructions for controlling a data processor to create a composite baseline, the plurality of instructions comprising:
    instructions that cause the data processor to receive information identifying a first baseline and a second baseline, the first baseline comprising a first baseline type and a first baseline time period that corresponds to a future time, and the second baseline comprising a second baseline type that is different from the first baseline type and a second baseline time period that is different from the first baseline time period;
    instructions that cause the data processor to create the composite baseline based at least in part on a combination of performance metric data that corresponds to the first baseline time period and the second baseline time period; and
    instructions that cause the data processor to process the performance metric data of the composite baseline based at least in part on the first baseline type and the second baseline type, the first baseline type comprising a future-based baseline type and the second baseline type comprising at least one of a moving window type, a non-contiguous time type, or a composite baseline type.

2. The non-transitory computer-readable medium of claim 1, the plurality of instructions further comprising instructions that cause the data processor to determine metrics data that are associated with the plurality of baselines and instructions that cause the data processor to associate the metrics data with the composite baseline.

3. The non-transitory computer-readable medium of claim 2, the plurality of instructions further comprising:
    instructions that cause the data processor to receive time information defining a period of time for the composite baseline; and
    instructions that cause the data processor to filter the metrics data based on the time information.

4. The non-transitory computer-readable medium of claim 2, the plurality of instructions further comprising:
    instructions that cause the data processor to receive a criterion for the composite baseline; and
    instructions that cause the data processor to filter the metrics data based on the criterion.

5. The non-transitory computer-readable medium of claim 2, the plurality of instructions further comprising:

instructions that cause the data processor to define a time window;

instructions that cause the data processor to associate the time window with a first period of time;

instructions that cause the data processor to associate first metrics data based on the first period of time;

instructions that cause the data processor to associate the time window with a second period of time, the second period of time including a period of time not included in the first period of time; and instructions that cause the data processor to associate second metrics data based on the second period of time.

6. The non-transitory computer-readable medium of claim 1 wherein the time information defines a window corresponding to a period of time of "N" days, where the "N" days is automatically updated once every predetermined time interval as time progresses.

7. The non-transitory computer-readable medium of claim 1, wherein at least one other baseline of the plurality of baselines comprises a second baseline time period that corresponds to a past time.

8. A method for creating a composite baseline, the method comprising:

receiving, by a computer, information identifying a plurality of baselines, at least one baseline of the plurality of baselines comprising a baseline type and a baseline time period that corresponds to a future time, at least a start time or an end time of the baseline time period being initially temporally at the future time defined when performance metric data satisfies one or more conditions;

creating, by the computer, the composite baseline based at least in part on a combination of the performance metric data that corresponds to at least a subset of each baseline time period;

determining whether the performance metric data satisfies the one or more conditions at a current time;

associating the performance metric data with the start time or the end time of the baseline time period when the performance metric data satisfies the one or more conditions at the current time; and processing, by the computer, the performance metric data of the composite baseline based at least in part on at least a subset of each baseline type.

9. The method of claim 8, further comprising:

receiving time information defining a period of time for the composite baseline; and filtering the metrics data based on the time information.

10. The method of claim 8, further comprising:

receiving a criterion for the composite baseline; and filtering the metrics data based on the criterion.

11. The method of claim 8, further comprising:

defining a time window;

associating the time window with a first period of time;

associating first metrics data based on the first period of time;

associating the time window with a second period of time, the second period of time including a period of time not included in the first period of time; and associating second metrics data based on the second period of time.

12. The method of claim 8 wherein the time information defines a window corresponding to a period of time of "N" days, where the "N" days is automatically updated once every predetermined time interval as time progresses.

13. The method of claim 8, wherein at least one other baseline of the plurality of baselines comprises a second baseline time period that corresponds to a past time.

14. A system for creating a composite baseline, the system comprising:

a hardware processor; and a memory storing a plurality of instructions that cause the processor to:

receive information identifying a plurality of baselines, at least one baseline of the plurality of baselines comprising a baseline type and a baseline time period that corresponds to a future time, at least a start time or an end time of the baseline time period being initially temporally at the future time defined when performance metric data satisfies one or more conditions;

create the composite baseline based at least in part on a combination of the performance metric data that corresponds to at least as subset of each baseline time period;

determine whether the performance metric data satisfies the one or more conditions at a current time;

associate the performance metric data with the start time or the end time of the baseline time period when the performance metric data satisfies the one or more conditions at the current time; and process the performance metric data of the composite baseline based at least in part on at least a subset of each baseline type.

15. The system of claim 14, the plurality of instructions further comprising:

instructions that cause the data processor to receive time information defining a period of time for the composite baseline; and instructions that cause the data processor to filter the metrics data based on the time information.

16. The system of claim 14, the plurality of instructions further comprising:

instructions that cause the data processor to receive a criterion for the composite baseline; and instructions that cause the data processor to filter the metrics data based on the criterion.

17. The system of claim 14, the plurality of instructions further comprising:

instructions that cause the data processor to define a time window;

instructions that cause the data processor to associate the time window with a first period of time;

instructions that cause the data processor to associate first metrics data based on the first period of time;

instructions that cause the data processor to associate the time window with a second period of time, the second period of time including a period of time not included in the first period of time; and instructions that cause the data processor to associate second metrics data based on the second period of time.

18. The system of claim 14 wherein the time information defines a window corresponding to a period of time of "N" days, where the "N" days is automatically updated once every predetermined time interval as time progresses.

* * * * *

UNITED STATES PATENT AND TRADEMARK OFFICE
CERTIFICATE OF CORRECTION

| | | |
|---|---|---|
| PATENT NO. | : 9,710,353 B2 | Page 1 of 1 |
| APPLICATION NO. | : 14/665173 | |
| DATED | : July 18, 2017 | |
| INVENTOR(S) | : Michael Feng et al. | |

It is certified that error appears in the above-identified patent and that said Letters Patent is hereby corrected as shown below:

In the Drawings
Sheet 10 of 11, Title of Drawing, FIG 6; remove "though" and replace with --through--

In the Specification
Column 3 Line 1; remove "for" and replace with --For--
Column 3 Line 67; remove "storage." and replace with --storage,--
Column 10 Line 26; remove "envelop" and replace with --envelope--
Column 10 Line 32; remove "envelop" and replace with --envelope--
Column 11 Lines 53-54; remove "may determined" and replace with --may be determined--
Column 11 Line 57; remove "$t_s$" and replace with --$T_s$--
Column 11 Line 58; remove "$t_e$" and replace with --$T_e$--
Column 11 Line 59; remove "$t_s$" and replace with --$T_s$-- AND remove "$t_e$" and replace with --$T_e$--
Column 11 Line 60; remove "$t_s$" and replace with --$T_s$-- AND remove "$t_e$" and replace with --$T_e$--
Column 12 Line 10; remove "S110" and replace with --5110--
Column 12 Line 12; remove "S120" and replace with --5120--
Column 12 Line 14; remove "S130" and replace with --5130--
Column 12 Line 18; remove "S140" and replace with --5140--
Column 12 Line 23; remove "S150" and replace with --5150--
Column 12 Line 25; remove "S160" and replace with --5160--
Column 12 Line 28; remove "S170" and replace with --5170--
Column 12 Line 32; remove "S200" and replace with --5200--
Column 12 Line 33; remove "S210" and replace with --5210--
Column 12 Line 36; remove "S220" and replace with --5220--
Column 12 Line 37; remove "S230" and replace with --5230--
Column 12 Line 39; remove "S240" and replace with --5240--
Column 12 Line 42; remove "S250" and replace with --5250--
Column 12 Line 46; remove "S260" and replace with --5260--
Column 12 Line 48; remove "S270" and replace with --5270--
Column 12 Line 51; remove "S280" and replace with --5280--

Signed and Sealed this
Twenty-sixth Day of February, 2019

Andrei Iancu
*Director of the United States Patent and Trademark Office*